No. 658,422. Patented Sept. 25, 1900.
A. & L. BRALY.
MEANS FOR DETECTING FALSIFICATION OF LIQUID OR OTHER PRODUCTS, &c.
(Application filed Nov. 16, 1896.)
(No Model.) 3 Sheets—Sheet 1.

Witnesses:
L. M. Hochschlager
Geo. O. Morse

Inventors
André Braly
Louis Braly
By Briesen & Knauth
their Attorneys

THE NORRIS PETERS CO., PHOTO-LITHO., WASHINGTON, D. C.

No. 658,422. Patented Sept. 25, 1900.
A. & L. BRALY.
MEANS FOR DETECTING FALSIFICATION OF LIQUID OR OTHER PRODUCTS, &c.
(Application filed Nov. 16, 1896.)
(No Model.) 3 Sheets—Sheet 2.

No. 658,422.  
A. & L. BRALY.  
Patented Sept. 25, 1900.  
MEANS FOR DETECTING FALSIFICATION OF LIQUID OR OTHER PRODUCTS, &c.  
(Application filed Nov. 16, 1896.)  
(No Model.)  
3 Sheets—Sheet 3.
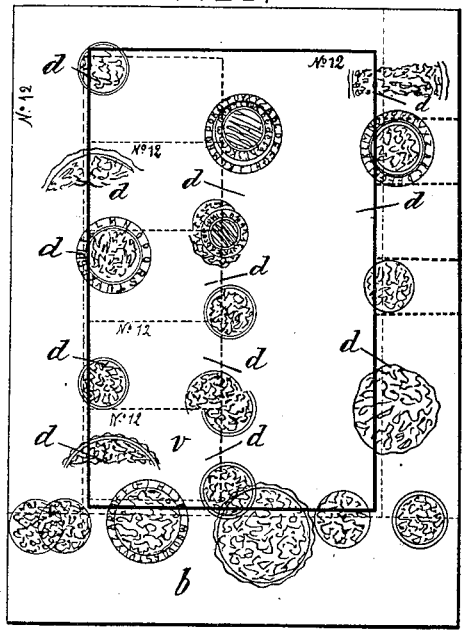
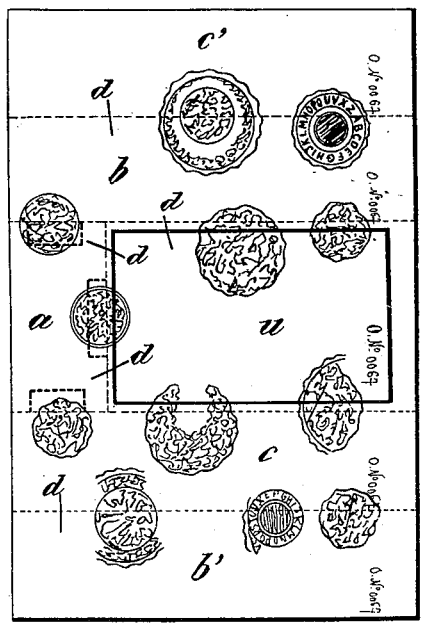

UNITED STATES PATENT OFFICE.

ANDRÉ BRALY AND LOUIS BRALY, OF LYONS, FRANCE.

MEANS FOR DETECTING FALSIFICATION OF LIQUID OR OTHER PRODUCTS, &c.

SPECIFICATION forming part of Letters Patent No. 658,422, dated September 25, 1900.

Application filed November 16, 1896. Serial No. 612,248. (No model.)

*To all whom it may concern:*

Be it known that we, ANDRÉ BRALY and LOUIS BRALY, of the city of Lyons, France, have invented Improved Means for Detecting the Falsification of Liquid or other Products, Works of Art, and Monetary and other Documents, of which the following is a full, clear, and exact description.

Our invention relates to means for preventing falsification of various articles.

In order that the object of the invention may be readily understood, we will proceed to describe the same by way of example with reference to the accompanying drawings, in which—

Figure 1:
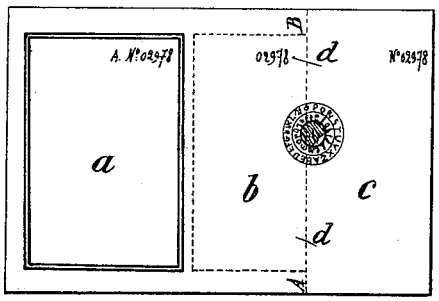
Figure 2:
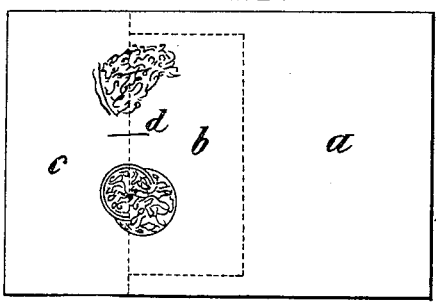
Figure 3:
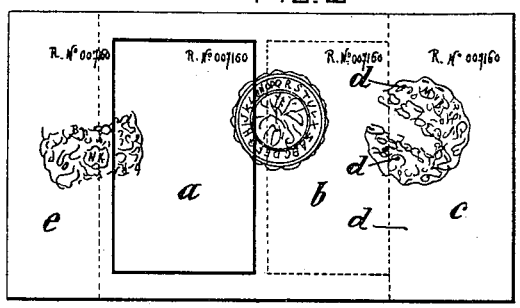
Figure 8:
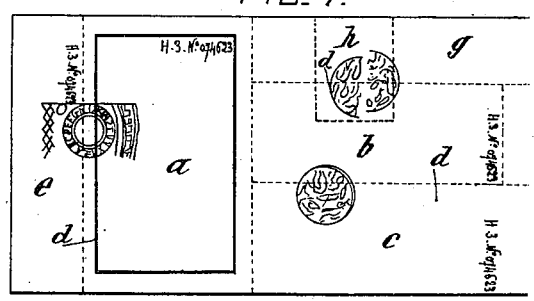
Figure 4:
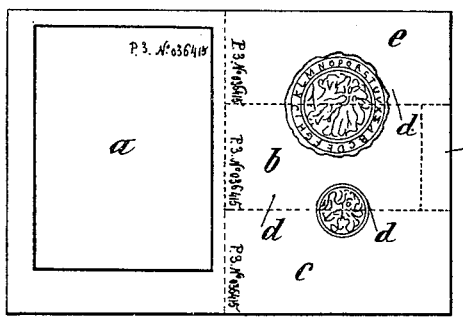
Figure 5:
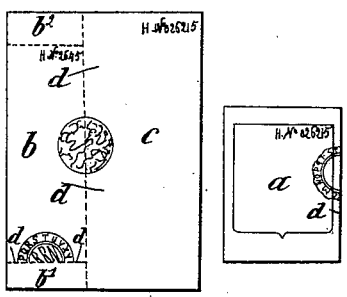

Figure 1 represents a face view, and Fig. 2 a back view, of a label. Figs. 3 and 4 are modifications. Fig. 5 shows the kind of label used in the case of a small receptacle. Figs. 6 to 10 represent the special kind of label to be applied to large or small bottles, casks, and other containers of which it is desired to prevent the contents from being surreptitiously emptied by their filling-orifice. Fig. 11 shows a bottle having the labels applied. Figs. 12, 13, 14, and 15 show various devices for detecting tampering with and otherwise insuring the authenticity of documents, checks, works of art, and pictures.

The same letters of reference indicate corresponding parts in all the figures.

The label consists, essentially, of the part $a$, constituting the label proper, the check-foil $b$, and the counterfoil $c$. The person desirous of preventing the counterfeiting of his mark imprints upon the face or back or upon both sides of the parts $b\ c$ of the label one, two, or more impressions of as varied design as possible, after which the counterfoil $c$ is severed therefrom along a line A B and is retained by the person who has impressed the stamps. The check-foil $b$ serves to enable the purchaser of the goods to verify their origin, for which purpose it is simply necessary to carefully detach the foil at the line of perforations, so that it may be compared with the counterfoil in the possession of the vender in order to ascertain whether it corresponds exactly or not thereto. In order to prevent confusion and enable a prompt verification to be effected, each part $a\ b\ c$ of the label is similarly seriated and numbered, so that no two labels shall bear the same serial letter and number. The label $a$ and the margins only around the check-foil $b$ are stuck on the bottle or other receptacle, so as to enable the easy detachment of the foil $b$ and at the same time prevent the stamps upon the reverse side being visible. The adhesive used should preferably consist of paste mixed with silicate of potash, so as to prevent the labels being detached without destroying them.

To facilitate the verification of the impressions, each label bears upon both sides short strokes $d$, made across the line of severance A B and serving as guides for matching the two counterfoils $b\ c$. Under these conditions the imitation of labels becomes such a difficult problem that no one would any longer have any practical interest in attempting it, as the imitations would necessarily be so imperfect and so easily detected that the counterfeiter would run very serious risk of prosecution. If, however, in addition to the precautions above described, each label be stamped with constantly-varying designs produced independently of the will of the person applying them, the difficulties and cost of falsification would be so great for each label as to compel the abandonment of the idea.

Figs. 1 to 5 represent the kind of label to be applied to bottles, cases, or other containers of which it is not desired to guard against the emptying of their contents, the aperture by which they are usually filled being therefore left unprotected.

Upon the check-foil $b$, which accompanies the label $a$, is printed in the form of an explanatory note the use to which it can be put. This note may, however, in order to leave the surface of the check-foil $b$ clear, be printed at the bottom margin of the label. Each label also bears a special notification to the purchaser that each should bear a serial reference letter and number and have a check-foil attached at the right-hand side. The counterfoil $c$ is retained by the seller, as before mentioned, in order to permit of verifying the label. Each series may be of any desired numerical extent and may vary as regards paper and printing and be represented by letters or numbers, or both combined, and be applied to any given description of goods at the option of the vender.

It will be understood that the manufacturer or trader may vary according to his taste or requirements the form of the stamps, the line of severance of the latter, and the text inscribed on the check-foil at the foot of the label. The label may also be provided with a third check-foil $e$, placed either at the left-hand side (see Fig. 3) or on the right-hand side. (See Fig. 4.) In the latter case the check-foil $b$ would be affixed to the receptacle by the gummed strip $f$, leaving the check-foil $b$ to be easily detached. The check-foil $e$ serves to enable the exporter to exercise a control over his agent abroad when sending him the counterfoils $c$ for the purpose of facilitating on the spot the verification of the labels in circulation within his district.

The label represented in Fig. 4 need have only two stubs—viz., a check-foil and counterfoil—instead of three, in which case the right-hand half of the label would be divided into two parts only.

For small containers which are not of sufficient size to admit of pasting on a complete label, such as those before described, the check-foil $b$ and counterfoil $c$ would be separate from the label, as in Fig. 5, but bear the same series and number. The check-foil, which is in this case independent and is to be wrapped around the container, is provided with two narrow marginal strips $b'$ $b^2$ at its ends, over which the label is pasted as far as the line of perforations at which its detachment for verification is effected, a stamp being afterward impressed on the adjacent portions of the label and check-foil. The label may also be accompanied by an extra check-foil, as in the case of Figs. 3 and 4.

Figure 6:
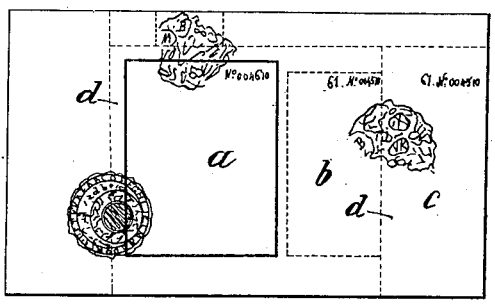
Figure 7:
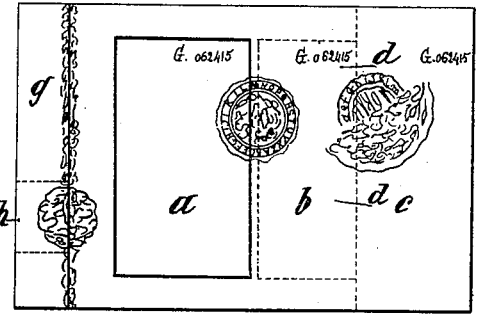
Figure 9:
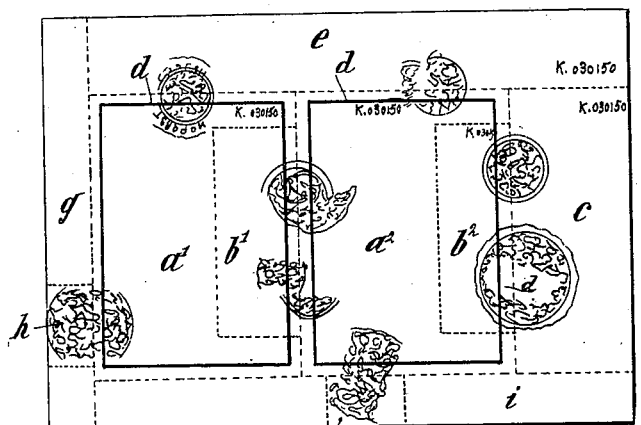

Figs. 6 to 9 show a modified form of label to be applied to bottles and receptacles of all kinds for preventing the fraudulent emptying or refilling of the same. In Figs. 6 and 7 the label is of a similar type to the one above described with the addition of a stamped band $g$, placed either at the top or left-hand side of the label, which is detached and then pasted (except the part $h$, comprised between the two lines of perforation,) around the neck of the bottle, so as to envelop the base of the capsule covering the cork. As the half of the stamp on the band has its counterpart on the label or check-foil, it is easy by detaching the unpasted portion $h$, comprised between the lines of perforations on the band and placing it in juxtaposition with the counterpart to ascertain whether the two halves of the stamp correspond and so show whether the band has been counterfeited. A more perfect guarantee, which would render the band still more inviolable, may be obtained by arranging it in the manner shown in Fig. 8, in which the band is stamped both at front and back. As the check-foil $b$ is pasted by its ends only on the bottle, it permits when detached of comparing the stamps on both sides of the band with their counterparts. In Fig. 7 the left-hand side of the label bears a band or stripe of fanciful design, upon which is applied a stamp to be divided into two parts, the stripe when cut with the scissors lengthwise in an irregular line serving of itself as a means of verifying whether the band placed on the neck of the bottle is the one which was cut off the label. For casks and other large containers, of which it is simply desired to prevent the emptying or the filling up with other liquids, the double label represented in Fig. 9 is used. This label comprises a label $a'$, to be applied to the sample-bottle, and a second label $a^2$ to accompany the cask and correspond with that pasted on the sample-bottle, each label being provided with a check-foil $b'$ $b^2$, the latter for verifying the origin of the cask and the former for verifying whether the label $a'$ corresponds to that on the cask. The label further comprises a counterfoil $c$, which is to be retained by the vender, a check-foil $e$ for providing him with a check on the intermediate agent both in respect of the label applied on the sample-bottle and that pasted upon the cask, a band $g$, which would be pasted on the neck of the bottle, so as to envelop the capsule, provided, as before, with a detachable portion $h$, and a band $i$, pasted vertically on the neck and secured, together with the capsule $k$, by a staple $j$, Fig. 11, the ends of the strip being fastened down by the label and the strip being also provided with a detachable portion $l$. The label $a'$ and bands are pasted on the sample-bottle in the manner shown in Fig. 11 by first detaching from the entire label, Fig. 9, the left-hand label $a'$, as well as the stamped band $i$, which is beneath both labels, it being observable that the label just detached has also upon its left hand the stamped band $g$. By applying these three elements—viz., two bands for the neck of the bottle and a label and counterfoil—in the manner shown in Fig. 11 the contents of a sample-bottle of the liquid contained in the cask are rendered inviolable and may be forwarded by post or otherwise to the purchaser in order that he may verify on the arrival of the cask whether it has been tampered with by observing whether the check-foil $b'$ of label $a'$, pasted on the bottle, exactly corresponds with the label $a^2$, pasted over the cask-bung. The cask-label may also be verified by means of its check-foil $b^2$.

Figure 10:
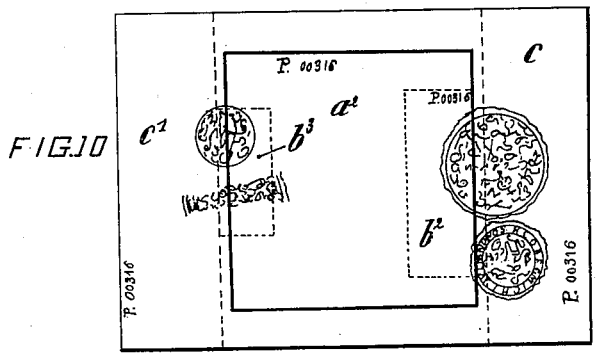
Figure 11:
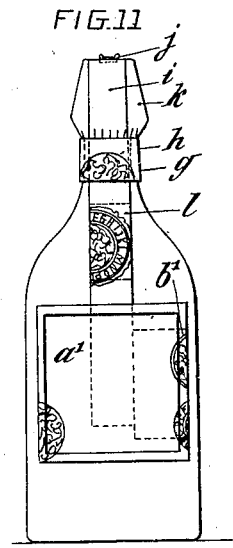

Fig. 10 represents another variation of the label intended to be pasted over the cask-bung when the vessel containing the sample is placed in the interior of the cask. The "label" $a^2$, properly so called, is provided with two check-foils $b^2$ $b^3$, detachable along the lines of perforations, as shown, and with two counterfoils $c$ $c'$, which are cut off by means of scissors. The right-hand counterfoil $c$ should correspond exactly with the one sent by post to the purchaser, the other counterfoil $c'$ being retained by the seller in case of loss of the first.

The invention may also be applied for the purpose of verifying the genuineness of checks, documents, works of art, &c.

Figure 12:
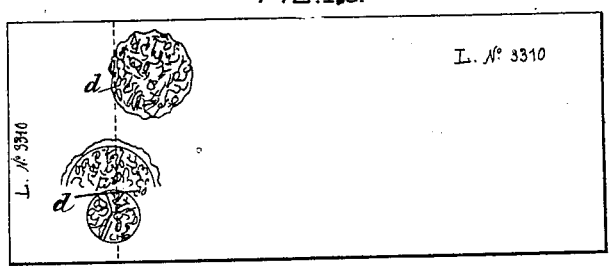

For documents of an important character, signatures, receipts, &c., the form of which would vary according to circumstances, the device illustrated in Fig. 12 is employed, which consists in impressing upon the line at which the document $a$ is severed by the scissors from its check-foil $b$, both at front and back, a sufficient number of stamps more or less fortuitously mutilated or broken off, so that forgery becomes absolutely impossible.

Figure 13:
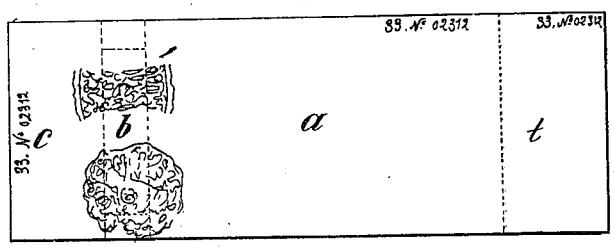

To prevent the forgery of signatures on checks, the device indicated in Fig. 13 is employed. Each check $a$ is provided, in addition to its ordinary counterfoil $t$, with a counterfoil $c$, to be retained by the bank, so as to permit of verifying the check when presented, and a check-foil $b$, which is severed at the two dotted lines and which will be gummed by its two ends to the corresponding check, so as to enable the genuineness of the signature to be ascertained. These check-foils $b$ would form a little book kept separately from the check-book. Stamps are impressed at the same time upon the check $a$, check-foil $b$, and counterfoil $c$. By this means not only the possessor of a check-book need not fear the abstraction and the imitation of his signature, but the banker can also with the aid of the counterfoil which he has retained verify the genuineness of the signature before cashing the check presented for payment. The owner of such a check-book need only to safeguard the small book or packet of check-foils $b$ bearing the middle portion of the stamps impressed upon the check by the bank and to attach each strip to its corresponding check by sticking the ends of the check-foil thereto.

In the case of the sale of pictures, works of art, &c., the label would be a document made of special paper, with a weft of flax or silk, of which one portion only would constitute the label proper.

For pictures the label would preferably be arranged as shown in Fig. 14, and comprises the document $u$, forming the certificate of authenticity of the picture and constituting the sale-note, on the right of which is a strip $a$, to be cut off the document, bearing stamps on both sides and also the same signature as on the document, and should be handed to the purchaser and pasted on the back of the picture with paste prepared with silicate of potash in order to prevent its being removed. The parts comprised between the dotted lines are alone left unattached, so as in the extreme case of dispute to enable the stamps on the back of the strip to be inspected and verified. The document further comprises a strip $c$ to be retained by the artist and a check-foil $b$, which should be filed and serves to enable the document, the foil attached to the picture, and the foil retained by the artist to be each verified. These three parts $a\ b\ c$ each bears the signature of the artist, like the document $u$, handed to the purchaser, together with the name of said purchaser and the subject of the picture. The sale-note bears the same number as the three strips $a\ b\ c$ and has also attached to it a greater or less number of counterfoils $v$, which are also numbered and serve for inscribing thereon successive sales, as well as for enabling each new purchaser to verify the genuineness of the picture by referring to the artist. The dimensions of the document and also of the check-foils may vary at will.

In selling works of art the form of our device shown in Fig. 15 is preferably employed. The document would then comprise the sale-note $u$, the "label" $a$, properly so called, the size of which would vary according to the article on which it is to be pasted, provided, as before, with small readily-detachable counterfoils to serve for checking, a check-foil $b$, which is to be filed, a check-foil $b'$, which is to be retained by the vender, a check-foil $c$, to be handed to the purchaser with the document $u$, so as to enable him to verify by reference to the vender the genuineness of the article, a second check-foil $c'$, serving the same purpose as the previous one in the event of loss of the check-foils $c$ or $b'$. This second check-foil $c'$ may, however, be dispensed with. The three small perforated counterfoils serve to verify the sale-note $u$, the filed counterfoil $b$, and the first check-foil $c$. The label and check-foils would all bear the same serial letter and number as the sale-note, as well as the signature of the author of the work of art.

The verification of the labels may also be effected by stamping on the label and its counterfoils identical designs, care being taken to vary these designs for each label.

In lieu of the stamps any designs varying in form and position with regard to each other may be employed.

We claim—

As a means for preventing the falsification of articles, such as articles of commerce, documents, works of art, &c., the combination with the article to be protected, of a means for labeling the same comprising a label proper containing a desired designation or information concerning the article applied to the said article and bearing a distinguishing mark such as a serial number, a check-foil removably borne by the article, said check-foil being provided with a distinguishing mark or number similar to that of the label and a counterfoil $c$ similarly distinguished to be retained by the vender, the said two checks or counterfoils being provided with complementary portions of a designation, device or stamp whereby the said two foils may be fitted together to produce the entire designation or stamp, whereby the check-foil attached to the article may be removed by the purchaser and returned to the original vender where the said check-foil may be fitted to the corresponding check or counter foil and the genuineness of the article to which the two foils relate, thereby determined.

The foregoing specification of our "Improved means for preventing the falsification of liquid and other products, works of art, monetary and other documents, and apparatus for use in connection therewith" signed by us this 17th day of October, 1896.

ANDRÉ BRALY.
      LOUIS BRALY.

Witnesses:
 H. T. SMITH,
 ALBERT MOREAU.